Feb. 19, 1952    S. W. HYATT    2,586,048
CABLE TIGHTENING AND REELING APPARATUS
Filed March 30, 1946    3 Sheets-Sheet 1
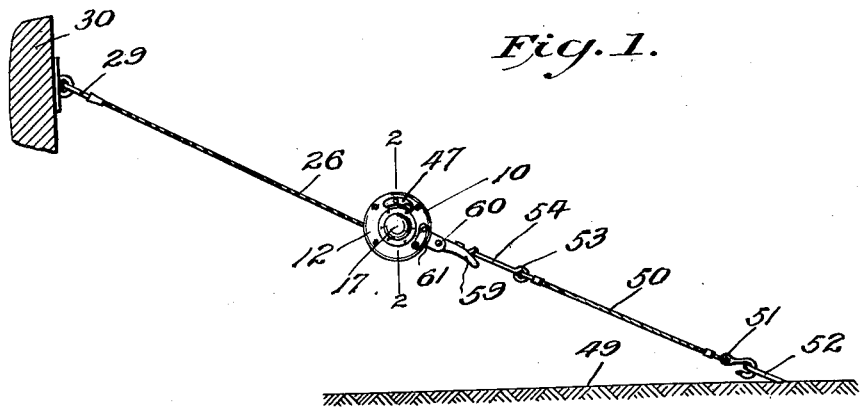
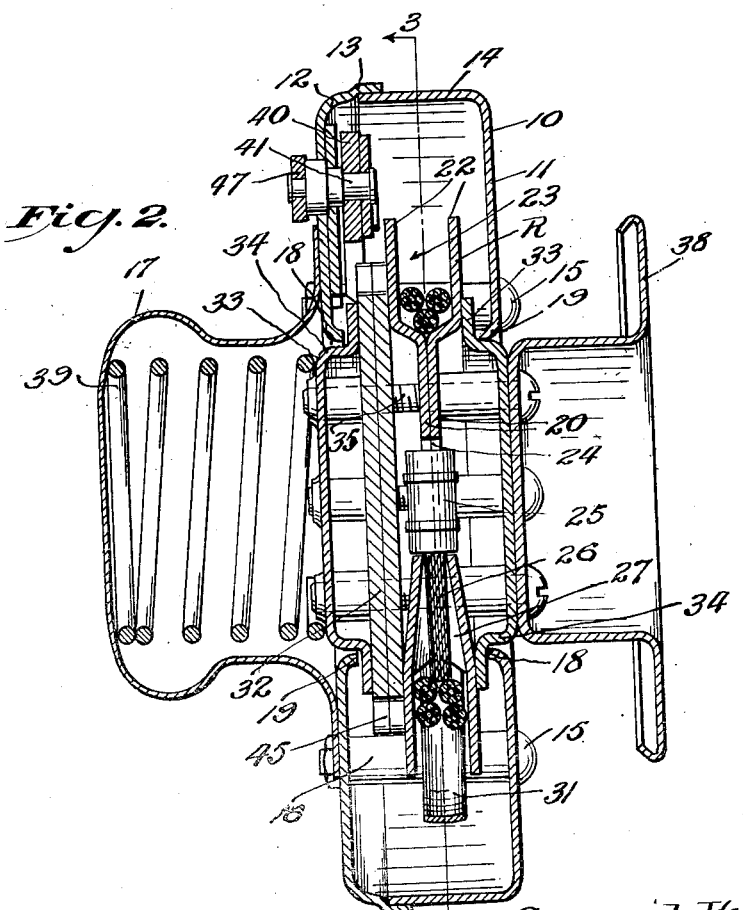
INVENTOR.
Samuel W. Hyatt
BY
Attorney Feb. 19, 1952   S. W. HYATT   2,586,048
CABLE TIGHTENING AND REELING APPARATUS
Filed March 30, 1946   3 Sheets-Sheet 2
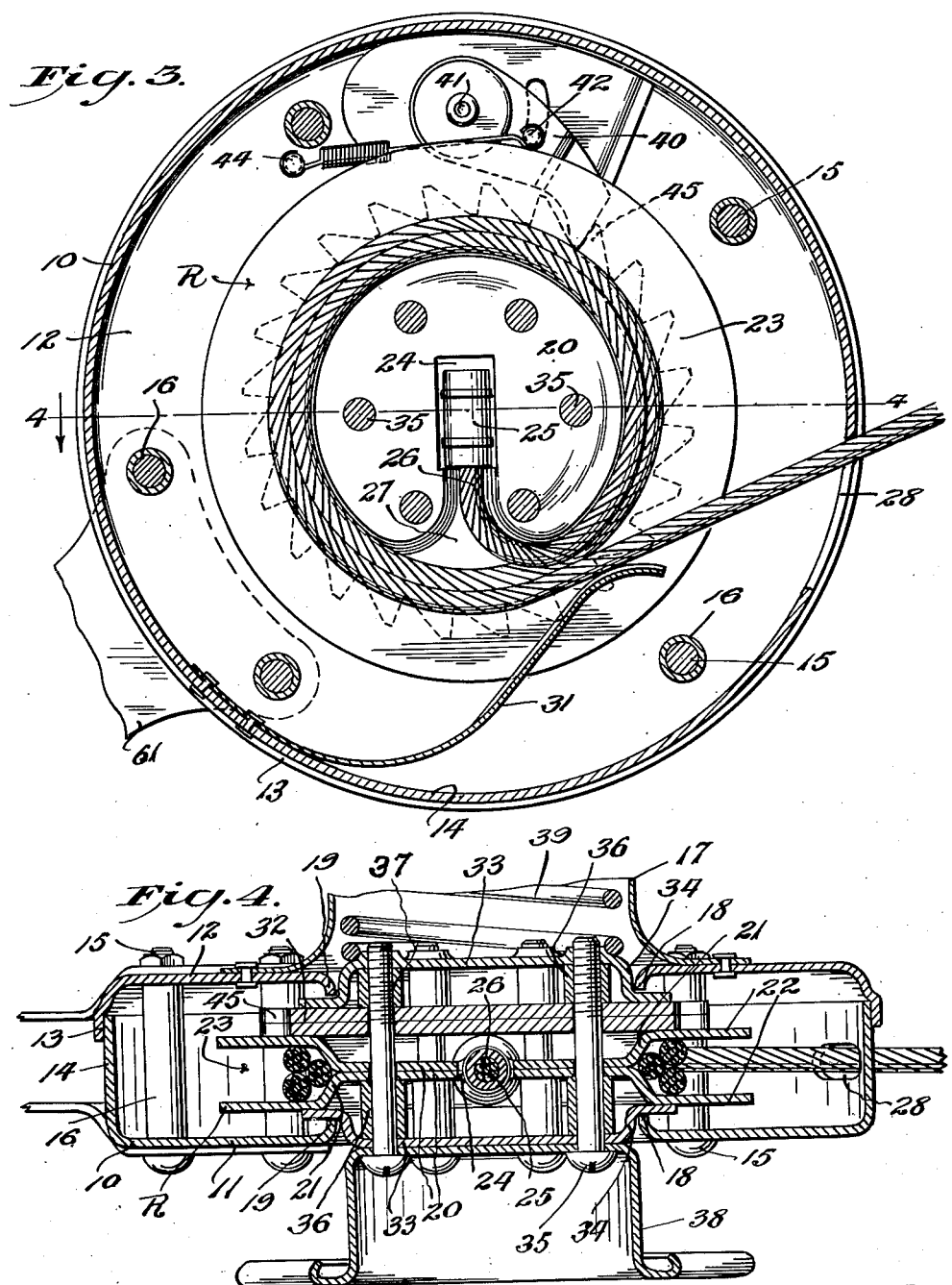
INVENTOR.
BY Samuel W. Hyatt
Attorney Feb. 19, 1952 S. W. HYATT 2,586,048
CABLE TIGHTENING AND REELING APPARATUS
Filed March 30, 1946 3 Sheets-Sheet 3
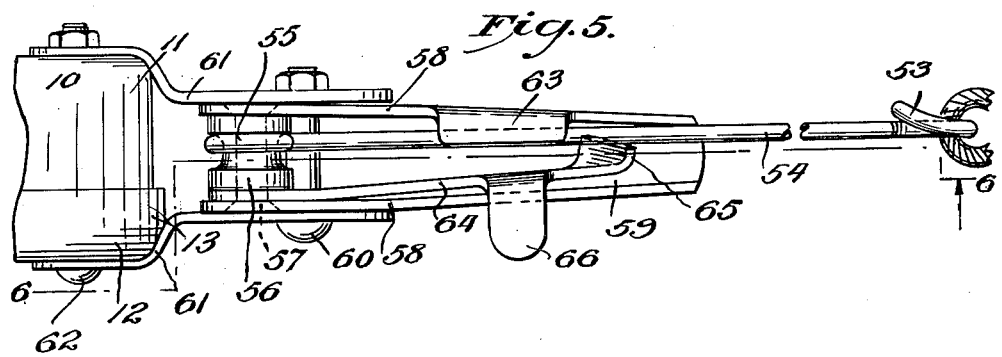
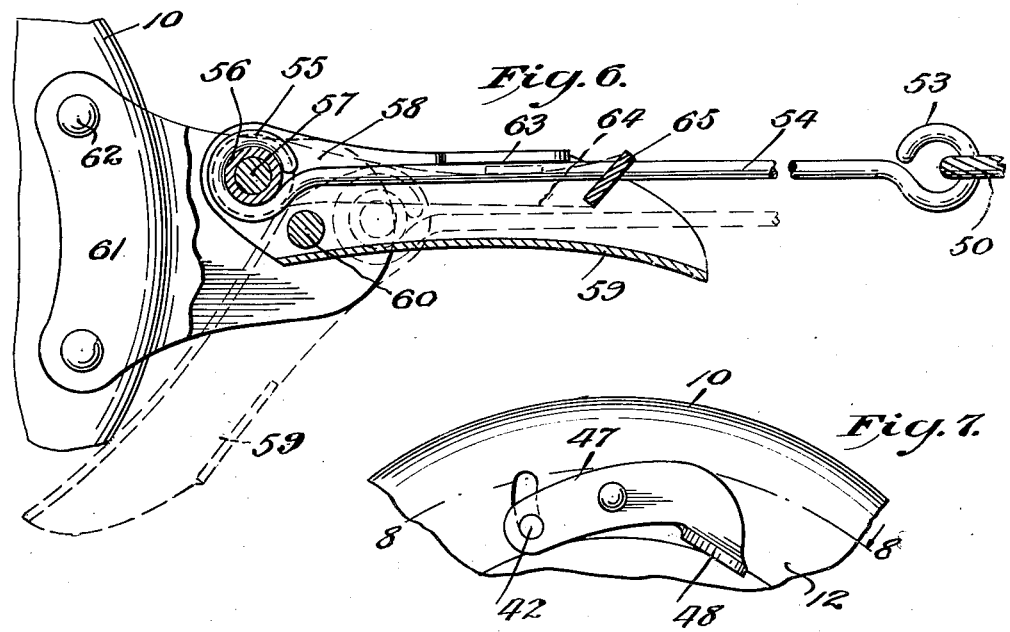
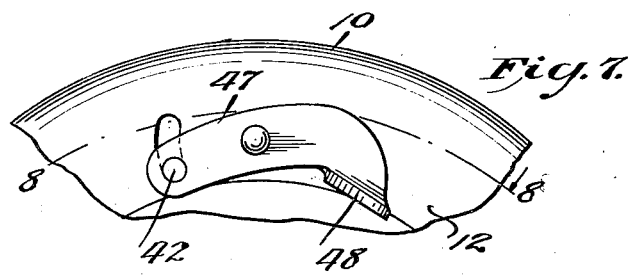
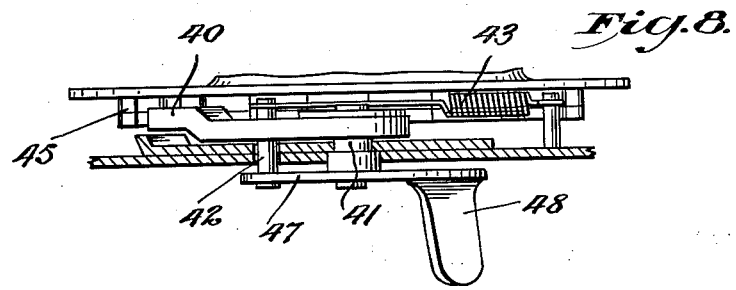
INVENTOR.
Samuel W. Hyatt
BY W. D. McDowell
Attorney Patented Feb. 19, 1952

2,586,048

UNITED STATES PATENT OFFICE 2,586,048

CABLE TIGHTENING AND REELING APPARATUS

Samuel W. Hyatt, Columbus, Ohio, assignor to The D. L. Auld Company, Columbus, Ohio, a corporation of Ohio Application March 30, 1946, Serial No. 658,379

8 Claims. (Cl. 254—161)

The present invention relates to improvements in cable-tightening and reeling apparatus, and refers more particularly to apparatus for tensioning cable lines, whereby to maintain the same in a taut condition when employed in such capacities as the lashing of cargo shipments, or in maintaining other associated bodies against accidental movement or displacement.

It is an object of the invention to provide a cable-tightening and reeling apparatus which may be easily and effectively operated and wherein a manually rotatable pawl and ratchet controlled drum is utilized for imparting initial tension to a cargo-lashing cable and wherein an associated lever mechanism is utilized to secure the final tensioning of the cable.

Another object of the invention is to provide apparatus of the character set forth in which structural simplicity, ease of operation and mechanical efficiency are present.

In connection with the foregoing objects, I have developed a number of novel structural details and part arrangements which may be thoroughly understood by reference to the following description and the accompanying drawings, wherein:

Fig. 1 is a side elevational view showing my improved cable reel in its operative position;

Fig. 2 is a vertical transverse sectional view taken through the reel on the plane indicated by the line 2—2 of Fig. 1;

Fig. 3 is a vertical sectional view on the line 3—3 of Fig. 2;

Fig. 4 is a horizontal sectional view on the line 4—4 of Fig. 3;

Fig. 5 is a top plan view of the clamping lever mechanism;

Fig. 6 is a sectional view on the line 6—6 of Fig. 5;

Fig. 7 is a fragmentary elevational view of the pivoted pawl-releasing arm;

Fig. 8 is a sectional view on the line 8—8 of Fig. 7.

Referring more particularly to the drawings, the numeral 10 designates the casing of my improved cable reel. Preferably, the casing comprises a base section 11 and a cover section 12, both of circular form, the cover section being provided with an outer annular flange 13 which telescopingly receives the corresponding outer flange 14 of the base section, the sections being held together by means of removable bolts and nuts 15 provided with spacing sleeves 16. The cover section is also formed with a hand-gripping knob extension 17.

The base and cover sections of the casing are formed with axially disposed openings 18 having inwardly bent flanges 19, and rotatably mounted on or between these flanges is a cable reel, indicated generally by the latter R. The reel proper embodies a pair of plates 20—20 which have their inner central portions placed side by side. Toward their outer peripheries, the plates are outwardly and angularly bent as at 21 to provide spaced circular walls 22 which form between them a cable-receiving groove 23. In the center of the reel, where the plates abut, an opening 24 is formed which is adapted to receive an anchoring sleeve 25 and to this sleeve there is permanently secured the inner end of a cable 26. From the sleeve 25, the cable passes through a framing recess 27 provided in said reel plates and is then wrapped spirally around the reel, occupying the groove 23 therein.

From the spiral wrappings on the reel, the cable extends exteriorly of the casing through an opening 28 provided in the outer peripheral flange of the base section 11, the outer or free end of the cable being adapted to be connected by a swivel connection 29 with an associated body 30 which is adapted to be lashed by the apparatus. Within the base section 11, there is provided a leaf spring 31 which bears on the cable and regulates the winding and unwinding thereof on or from the reel.

Rotatable with the reel is a ratchet wheel 32 which, for convenience in manufacture, consists of a pair of rigidly united registering plates, the ratchet wheel forming a component part of the reel R. Also forming a part of the reel R are bearing disks 33 which are formed with annular flanges 34 adapted to be positioned in the openings 18 of the casing and to engage with the flanges 19 for the purpose of maintaining in a central position the reel R.

Headed bolts 35 pass through registering openings provided in the disks 33, the ratchet wheel 32 and the reel plates 20. The shanks of these bolts may be provided with spacing thimbles 36, while the threaded ends of the bolts are received within internally threaded sleeves and openings 37 formed with or in one of the disks 33. Also, one of the disks 33 carries a hand wheel 38, which is arranged exteriorly of the reel casing on the opposite side of the latter as regards the knob extension 17, the hand wheel permitting of the rotation of the reel R.

The knob extension 17 is of hollow formation and receives a coil spring 39, the inner end of the latter bearing on one of the disks 33 in a frictional manner to normally restrain the reel against undue rotation. The teeth of the ratchet wheel 32 engage with the free end of a pawl 40 which is pivoted on a stud 41 carried by the cover section 12 of the casing. The pawl is formed with a pin 42 with which is connected one end of a coil spring 43, the opposite end of the latter being joined as at 44 with the section 12, the tension of the spring serving to maintain normally the outer end of the pawl in engagement with the ratchet teeth 45.

The pin 42 is extended to project through an arcuate slot 46 formed in the section 12 and its outer end is secured to one end of a pawl-actuating arm 47 disposed exteriorly of the reel casing. The arm 47 is pivotally mounted on the outer end of the stud 41. Also, said arm is provided at one end with an out-turned finger-engaging extension 48 which upon being depressed, rocks the arm 47 about its pivotal mounting and imparts corresponding movement to the pawl 40, so that the latter may be lifted to a position free from engagement with the ratchet teeth 45, thus allowing the cable 26 to pay out freely. To tighten the cable, the hand wheel 38 is rotated while the pawl 40 is in normal engagement with the teeth of the ratchet wheel 32. Such rotation results in winding the cable upon the reel R until a desired degree of initial tautness has been obtained.

The opposite side of the reel is secured to the bottom, floor or car deck, or to any other suitable base 49, by means of an anchoring cable 50 which, at its lower end, may be provided with a swivel hook 51 engaging an eye member 52 provided in the base 49.

The other or upper end of the cable 50 is joined with an eye 53 formed on the outer or lower end of a rod 54. The opposite end of the rod 54 is also provided with an eye 55 which is received by a spool 56 mounted on a rivet 57. The ends of this rivet are joined with the spaced upstanding walls 58 of a clamping lever 59. This lever is pivotally supported by a bolt 60, which passes through aligned openings provided in the walls 58 and through corresponding openings formed in a pair of bracket plates 61 which are secured as at 62 to the reel casing 10.

One of the walls 58 is formed with an overhanging lip 63 beneath which the rod 54 is positioned, as shown in Fig. 6. To positively maintain the rod in locked engagement with the lip 63, use is made of an arm 64, which is pivotally mounted on the rivet 57. The free end of this arm is offset as at 65 for frictional engagement with the side of the rod 54. Also, the arm 64 may be formed with a laterally bent actuating means 66.

In the use of the device, the outer end of the cable 26 is united by means of the connection 29 with the body 30 to be secured, and the cable 50 is joined by means of the hook 51 with the stationary base 49. The hand wheel 38 is then rotated to wind the cable 26 about the reel R until a desired degree of conveniently applied initial tension has been applied to the cables, the reel being held against reverse rotation by the spring pressed pawl 40 and the ratchet wheel 32. A final tensioning force is then obtained by rocking the clamping lever 59 from the dotted line position in Fig. 6 to the full line position with the rod 54 held against movement by the pressure of the arm 64 which maintains said rod beneath the lip 63. In releasing cable tension, the arm 64 is rotated about its pivot to unlock the rod so that the lever 59 may be swung downwardly (Fig. 6) to its dotted line or inactive position. The pawl 40 may then be elevated by the actuation of the arm 47, so that the reel R may be released to permit of the unwinding of the cable 26 and thereafter the removal of said cable from the body or bodies joined therewith.

In view of the foregoing, it will be seen that the present invention provides a simple, readily operated and strongly constructed cable reel which may be employed effectively in the capacity of lashing cargo bodies on the decks of vessels or car platforms. It may also be employed for holding airplanes on the ground when parked in exposed locations. The reel may also be employed in various other capacities.

Another important feature in the use of my appliance resides in applying initial tension to the lashing cable by means of the revolving reel, and thereafter applying the final tensioning forces to the cable through the actuation of the swinging lever mechanism.

While I have disclosed a preferred embodiment of my invention, nevertheless, it will be understood that the same is subject to certain structural variation or modification without departing necessarily from the scope and spirit of the following claims.

I claim:

1. Cable-reeling mechanism comprising a casing, a cable reel rotatably mounted within said casing, a bracket extension projecting from the exterior of said casing contiguous to its periphery, a cam lever pivotally mounted on said bracket extension, a reel-anchoring member pivotally connected on the cam portion of said lever, said lever being provided with an inturned lip beneath which said anchoring member is adapted to be positioned, and a manually operated locking arm pivotally mounted at one end on said bracket, the free end of said arm being arranged for engagement with said anchoring member to maintain the same in engagement with said lip.

2. Cable-reeling mechanism comprising a casing, a cable reel rotatably mounted within said casing, a bracket extension projecting from the exterior of said casing contiguous to its periphery, a lever pivotally mounted on said bracket extension, said lever including a transversely extending element disposed eccentrically of the pivotal mounting of said lever, a reel-anchoring member pivotally connected at one end with said transverse element, said lever being provided with an inturned lip beneath which said anchoring member is adapted to be positioned, a manually operated locking arm pivotally mounted at one end on said transverse element, the free end of said arm being arranged for engagement with said anchoring member to maintain the same in engagement with said lip, and a base cable secured to the outer end of said anchoring member.

3. In lashing apparatus including a casing, a manually operated reel rotatably mounted within said casing, a lashing cable connected at one end of said reel and extending through an opening formed in the periphery of said casing to an attaching object, an anchoring member extending from said casing on the side thereof opposite to the lashing cable, said anchoring member having the outer end thereof adapted for attachment to a fixed support, a lever arm pivotally carried by the outer part of said casing, and means uniting said anchoring member at the inner end thereof to said lever arm in eccentric relation to the pivotal axis of said arm, whereby to cause said arm when turned in one direction to apply final tensioning forces to both the lashing cable and anchoring member in addition to the tensioning forces originally obtained on said cables through the operation of said reel, a locking element connected to said casing and engageable with the anchoring member when the lever arm occupies its final cable tensioning position for positively locking the anchoring member in position.

4. Cable-reeling mechanism comprising a casing, a reel rotatably mounted within said casing, manually operated means for rotating said reel to apply initial tension to a cable wrapped around and having one end connected with the reel and with the opposite end of the cable connected with an object to be secured by said mechanism, a manually operated lever pivotally mounted on the exterior of said casing, and a casing anchor movably united at one end with said lever in offset relation to its axis of turning movement, the opposite end of said anchor being adapted for attachment with a fixed support, the turning of said lever in one direction serving to move said casing and anchor relative to each other and thereby apply final tensioning forces to said cable and a locking element connected to said casing and engageable with the casing anchor when the lever arm occupies its final cable tensioning position for positively locking the casing anchor in position.

5. Lashing apparatus comprising a casing, a manually operated reel rotatably mounted within said casing, a lashing cable connected at one end of said reel and extending through an opening formed in the periphery of said casing to an attaching object, an anchoring cable extending from said casing on the side thereof opposite to the lashing cable, said anchoring cable having the outer end thereof adapted for attachment to a fixed support, a lever arm pivotally carried by the outer part of said casing, means uniting said anchoring cable at the inner end thereof to said lever arm in eccentric relation to the pivotal axis of said arm, whereby to cause said arm when turned in one direction to apply final tensioning forces to both the lashing and anchoring cables in addition to the tensioning forces originally obtained on said cables through the operation of said reel, and means for positively retaining the lever arm against accidental movement when the same is positioned to apply final tensioning forces to said cables.

6. In combination a take-up reel and case, a sheave carrying hub rotatably mounted in the take-up reel case, a knob operatively connected to said hub and mounted externally of said case, a pawl and ratchet operatively connected to said sheave, a release lever mounted externally of said case and connected to said pawl, a chamber in said case, a helical spring in said chamber pressing against said hub, a cable rope carried by said sheave, an attaching means on said cable, and an anchor on said case comprising a bracket secured to said case, a cam lever pivoted to said bracket, an anchor hook pivoted on the cam portion of said lever, said lever being arcuate in cross section to receive the shank of said hook, a lug on said lever to lock the lever and hook in final adjusted position a locking element carried on said bracket and engageable with the anchor hook to hold the hook against the lug.

7. In combination with a take-up reel, including a sheave in said reel, a rope carried by said sheave, an attaching means on said rope, a hand knob on said reel operatively connected to said sheave, a pawl and ratchet to lock said sheave, a release device connected to said pawl, a spring mounted in said reel and pressing against said sheave to act as a friction brake and an anchor for said reel comprising a bracket secured to said reel, a cam lever pivoted to said bracket, an anchor hook pivoted on the cam portion of said lever, said lever provided with a groove to receive the shank of said hook, and a lug on said lever to lock the lever and hook in final adjusted position, a locking element carried on said bracket and engageable with the anchor hook to hold the hook against the lug.

8. Lashing apparatus for uniting a movable body with a relatively stationary body, comprising: a casing, a manually operated reel rotatably mounted within said casing, a lashing cable connected at one end with said reel and extending through an opening formed in the periphery of said casing for connection with one of said bodies, an anchoring connection extending from said casing on the side thereof opposite to said lashing cable, said anchoring connection having an outer end adapted for attachment to the other of said bodies, said reel being operable to place said cable under tension, a manually operable lever connecting said anchoring connection with said casing for applying final tensioning forces to said lashing cable in addition to tensioning forces applied thereto by the operation of said reel, and means for locking said lever in its cable-tensioning position, said last-named means comprising a second lever pivotally carried on said first-named lever and engageable with said anchoring connection when said first-named lever occupies its final cable-tensioning position for holding said first-named lever in locked engagement with said anchoring connection.

SAMUEL W. HYATT.

REFERENCES CITED

The following references are of record in the file of this patent:

UNITED STATES PATENTS

| Number | Name | Date |
| --- | --- | --- |
| 348,805 | Wheeler | Sept. 7, 1886 |
| 514,104 | Wickey | Feb. 6, 1894 |
| 673,778 | Merritt | May 7, 1901 |
| 739,738 | Starrett | Sept. 22, 1903 |
| 1,406,846 | Gleason | Feb. 14, 1922 |
| 1,767,938 | Monnier et al. | June 24, 1930 |
| 2,047,705 | Porter | July 14, 1936 |
| 2,051,735 | Michelson | Aug. 18, 1936 |
| 2,157,451 | Haubert | May 9, 1939 |
| 2,270,271 | Coffing | Jan. 20, 1942 |